(12) United States Patent
Willey et al.

(10) Patent No.: US 7,116,491 B1
(45) Date of Patent: Oct. 3, 2006

(54) GANGED FOCUS MECHANISM FOR AN OPTICAL DEVICE

(75) Inventors: Charles D. Willey, Roanoke, VA (US); Blair R. Dobbie, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/207,346

(22) Filed: Aug. 19, 2005

(51) Int. Cl.
*G02B 15/14* (2006.01)

(52) U.S. Cl. ...................... 359/694; 359/699

(58) Field of Classification Search ............... 359/694, 359/699, 700, 625, 626, 628, 798, 630–633; 250/504 R, 339.06
See application file for complete search history.

(56) References Cited

U.S. PATENT DOCUMENTS

| | | | |
|---|---|---|---|
| 5,606,458 A | * | 2/1997 | Fergason .................... 359/630 |
| 5,886,822 A | * | 3/1999 | Spitzer ....................... 359/630 |
| 6,147,805 A | * | 11/2000 | Fergason .................... 359/630 |
| 6,483,647 B1 | | 11/2002 | Zadravec .................... 359/634 |
| 6,560,029 B1 | | 5/2003 | Dobbie et al. .............. 359/631 |
| 6,787,747 B1 | | 9/2004 | Specht et al. ............ 250/201.3 |
| 2004/0042086 A1 | | 3/2004 | Beystrum et al. ........... 359/629 |

* cited by examiner

*Primary Examiner*—Ricky Mack
*Assistant Examiner*—M. Hasan
(74) *Attorney, Agent, or Firm*—RatnerPrestia (57) ABSTRACT

An optical device for viewing an image is provided. The optical device comprises a plurality of optical channels positioned adjacent one another, each optical channel having an image detector and a complimentary objective lens spaced by a respective distance. A focusing mechanism is coupled to the optical device and configured to simultaneously adjust the respective distance between the image detector and the objective lens of each optical channel.

20 Claims, 9 Drawing Sheets

GANGED FOCUS MECHANISM FOR AN OPTICAL DEVICE

FIELD OF THE INVENTION

The present invention relates to a ganged focus mechanism for use with an optical device, particularly suited for night vision applications.

BACKGROUND OF THE INVENTION

Night vision systems are used in a wide variety of military, industrial and residential applications to enable sight in a dark environment. For example, night vision systems are utilized by military aviators during nighttime flights or military soldiers patrolling the ground. Security cameras use night vision systems to monitor dark areas and medical instruments use night vision systems to alleviate conditions such as retinitis pigmentosis (night blindness).

Conventional image enhancement night vision equipment utilize an Image Intensifier ($I^2$) to amplify an image. The image intensifier collects tiny amounts of light in a dark environment, including the lower portion of the infrared light spectrum, that are present in the environment but may be imperceptible to the human eye. The image intensifier amplifies the light so that the human eye can perceive the image. The light output from the image intensifier can either be supplied to a camera, external monitor or directly to the eyes of a viewer. The image intensifier devices are commonly employed in vision goggles, i.e. a monocular or binocular, that are worn on a user's head for transmission of the light output directly to the viewer.

Image enhancement night vision equipment utilizes available light such as starlight and moon light. Although the image enhancement equipment will work in very reduced lighting, it may not work in environments of absolute darkness, such as caves or caverns. Furthermore, image enhancement equipment effectiveness may be reduced by battlefield obscuration such as smoke, fog, rain, dust, and foliage.

Standard night vision devices may be enhanced with the addition of thermal imaging, i.e. infrared (IR) information. Whereas conventional night vision devices employing image intensifiers can only see visible wavelengths of radiation, the enhanced system provides additional situational awareness by providing infrared (i.e. heat) information to the image. A typical scenario where this might be important is where a camouflaged person cannot be seen with an image intensifier device. However, with the addition of infrared information to the same image, the camouflaged person's heat signature is seen.

The enhanced night vision device commonly includes two channels for transmitting a scene image to the user. The first channel includes a thermal camera (i.e. infrared detector) and a complementary objective lens to transmit a scene image in a first spectral band. The second channel includes an image intensifier camera and another complementary objective lens to transmit the same scene image in a second spectral band. A processing module within the device fuses the images together and superimposes the images on each other. Such a device is disclosed in U.S. Pat. No. 6,560,029 which is incorporated herein by reference in its entirety.

The focus of each channel of the enhanced night vision device is individually adjusted by the user. More particularly, the position of each objective lens relative to each detector or camera is adjusted by the user. The devices typically do not allow for tracking of one objective lens relative to another objective lens for the purpose of simultaneously focusing the channels, or determination of and compensation for parallax disparity.

Thus, it would be advantageous to supply an apparatus which simultaneously focuses both channels of a fused system and tracks the position of one channel relative to another channel to compensate for parallax disparity.

SUMMARY OF THE INVENTION

According to one aspect of this invention, an optical device for viewing an image is provided. The optical device comprises a plurality of optical channels positioned adjacent one another, each optical channel having an image detector and a complimentary objective lens spaced by a respective distance. A focusing mechanism is coupled to the optical device and configured to simultaneously adjust the respective distance between the image detector and the objective lens of each optical channel.

According to another aspect of this invention, a focusing mechanism configured for use with an optical device having a plurality of optical channels positioned adjacent one another is provided. Each channel includes an image detector and a complimentary objective lens spaced by a respective distance, wherein the focusing mechanism is adapted to simultaneously adjust the respective distance between each respective image detector and objective lens.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

The invention will next be illustrated with reference to the figures. Such figures are intended to be illustrative rather than limiting and are included herewith to facilitate explanation of the present invention. The figures are not to scale, and are not intended to serve as engineering drawings.

Referring generally to the figures, a multiple channel optical device is designated by the numeral "10." Briefly, multiple channel optical device 10 may be used, for example, with a man-mounted night vision monocular arrangement, such as the one illustrated in U.S. Pat. No. 6,560,029. The multiple channel optical device 10 is adapted to observe and transmit an image to a prismatic video display (not shown) positioned in front of a user's eye. The subsequent description will concentrate on the details of optical device 10.

Figure 1A:
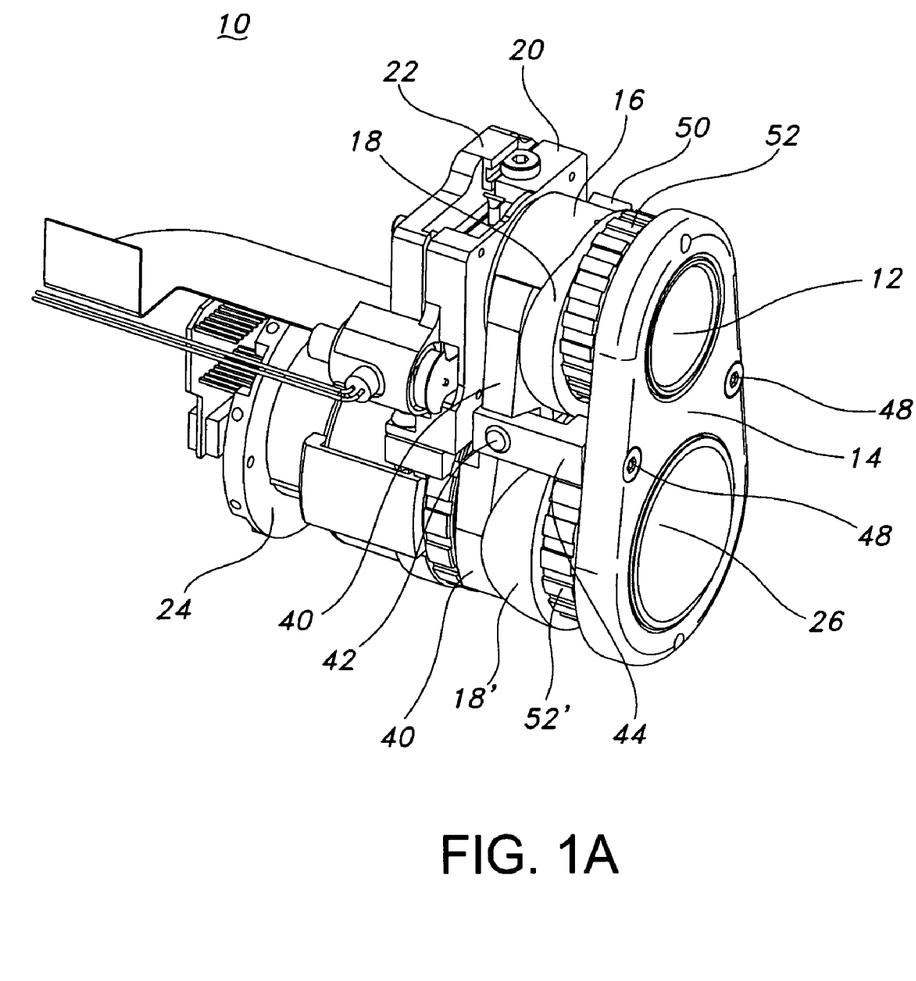
FIG. 1A is a perspective view from the top left of an exemplary embodiment of a night vision optical device used in accordance with the present invention.
Figure 1B:
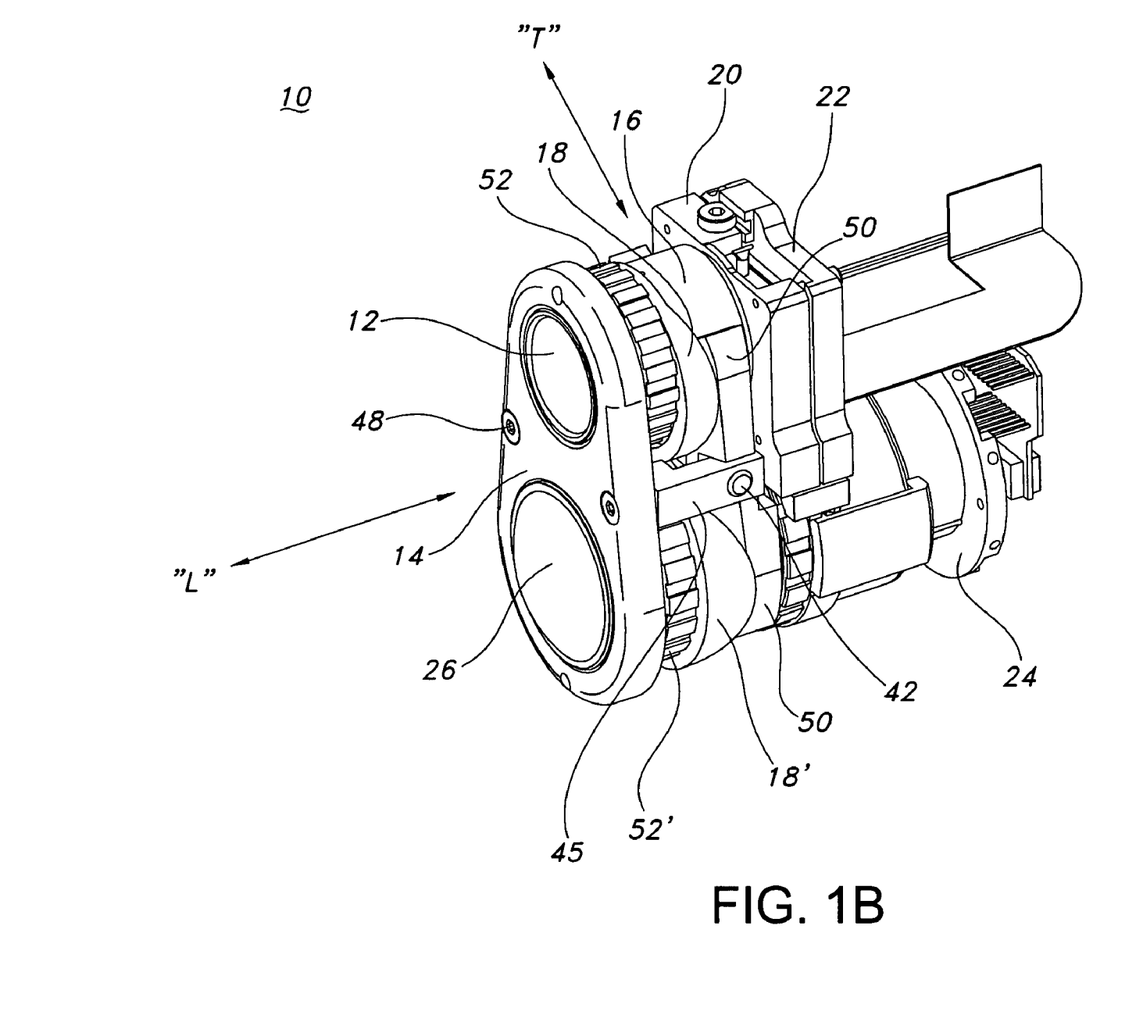
FIG. 1B is a perspective view from the top right of the night vision optical device of FIG. 1A.
Figure 1C:
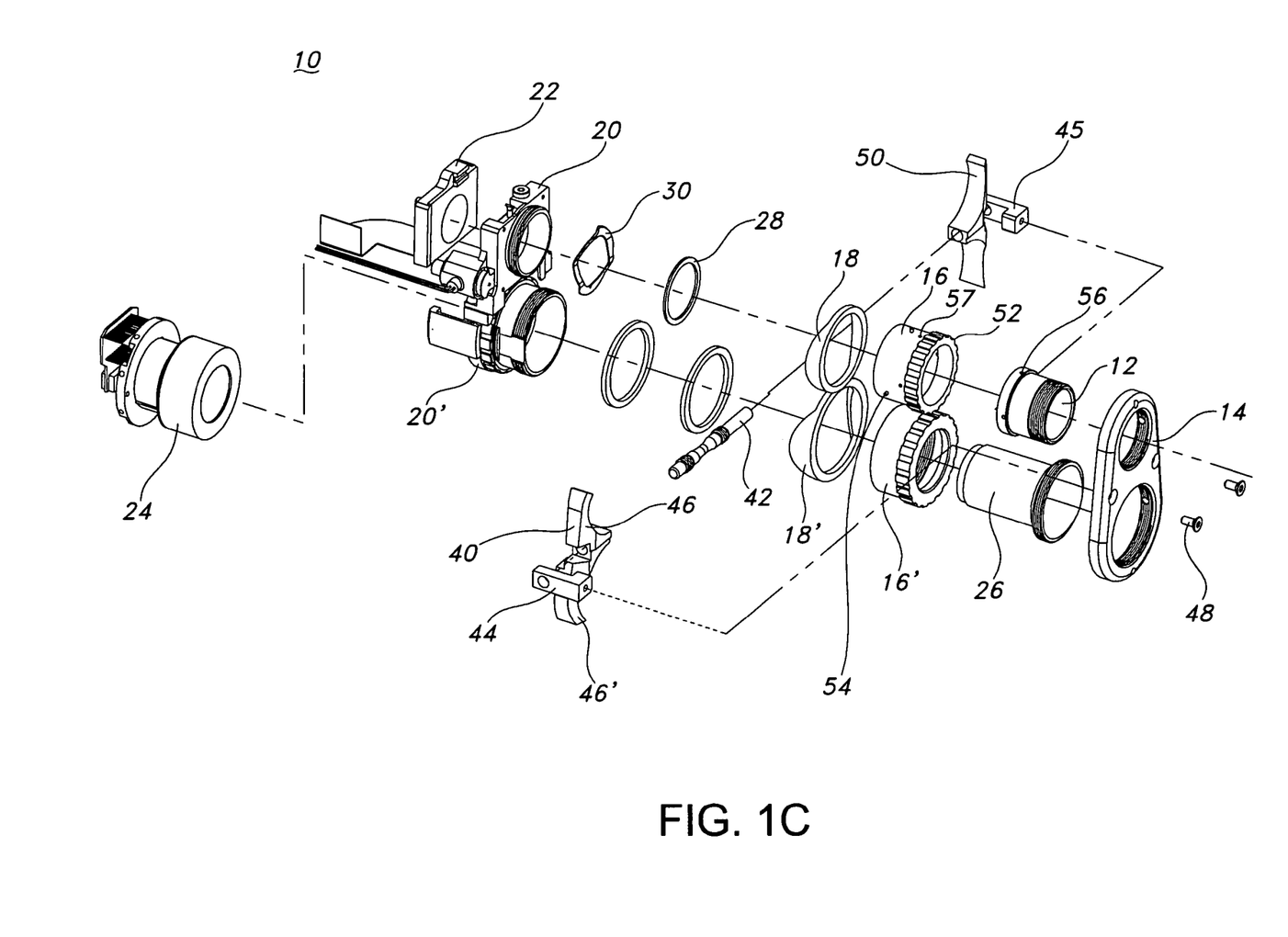
FIG. 1C is an exploded view of the night vision optical device of FIG. 1A for purposes of clarity.

In an exemplary embodiment, illustrated in FIGS. 1A–1C, optical device 10 includes two channels for transmitting a scene image. The first channel (i.e. top channel) includes infrared detector 22 (or IR camera) and complementary objective lens 12 adapted to transmit a scene image in a first spectral band. The second channel (i.e. bottom channel) includes image intensifier assembly 24 (or image intensifier camera) and a separate complementary objective lens 26 adapted to transmit the same scene image in a second spectral band. The components of the first channel are optionally positioned above the components of the second channel. In the interest of clarity, further description will reference the first channel (i.e. top channel) of optical device 10, as the mechanical structure of the two channels is similar.

According to an exemplary embodiment, the first channel includes two separate assemblies (i.e. the first assembly and the second assembly) that cooperate together to control the longitudinal distance between IR detector 22 and objective lens 12. The distance between IR detector 22 and objective lens 12 characterizes the focus of the first channel. The longitudinal and transverse directions are indicated by the arrows pointing to "L" and "T", respectively, in FIG. 1B.

The first assembly includes objective lens 12 which is threadedly engaged and fixed onto faceplate 14. A set of brackets 44 and 45 abut the rear side of faceplate 14 and are retained in a substantially fixed position by a set of fasteners 48 installed through the faceplate. More particularly, the fasteners threadedly engage a longitudinally threaded hole (see FIG. 1C) disposed in each bracket 44 and 45.

The opposing end of brackets 44 and 45 are positioned in a slot disposed in opposing cam drivers 40 and 50. A left and right handed screw 42, best illustrated in FIG. 1C, is threadedly engaged with threaded apertures disposed in both cam drivers and both brackets 44 and 45 so that a clockwise or counterclockwise rotation of screw 42 translates cam drivers 40 and 50 in opposite directions along a transverse axis. Both right-handed threads and left-handed threads are disposed on the exterior surface of the screw. The functionality of the left and right handed screw should be understood by one skilled in the art.

Although not shown, a wheel, knob, handle or other apparatus may be coupled to screw 42 to effect rotation of the screw and the resultant translation of the cam drivers. The wheel may be coupled to the ends of screw 42. It is also envisioned that a motor or other mechanized apparatus may be coupled to screw 42 for automated operation of device 10.

The cam drivers 40 and 50 include cam surface 46 that bears on another cam surface 48 of a floating collar 18. As the cam drivers translate along the transverse direction, they urge cam surface 48 of floating collar 18 in the longitudinal direction. More particularly, the cam drivers and the collar have angled surfaces to convert the transverse motion of the cam drivers into longitudinal motion of the collar. As will be explained further detail later, cam drivers 40 and 50 simultaneously bear on collar 18 of the first channel and collar 18' of the second channel. Thus, the translation of the cam drivers induces the simultaneous translation of the collars of the first and second channels. The interaction between cam drivers and the collars will be described in further detail later with reference to the remaining figures.

The collar 18 floats between the aforementioned first assembly and a second assembly. The second assembly includes a hollow sleeve 16 that is positioned about the cylindrical body of objective lens 12 and is adapted to float over the body of the objective lens. The sleeve includes a cylindrical body and knurled shoulder 52, whereby collar 18 is positioned about the cylindrical body of sleeve 16 and abuts the knurled shoulder of the sleeve. Thus, by virtue of the contact between the collar and the shoulder, the longitudinal translation of the collar induces the longitudinal translation of the sleeve.

The interior surface of sleeve 16 is threadedly engaged and fixed onto threaded flange 21 of translating carriage 20. The infrared detector 22 is mounted to the translating carriage with threaded fasteners or any other fastener known in the art. The translating carriage includes a cylindrical aperture through which the body of objective lens 12 passes through. More particularly, the carriage translates (i.e. rides) along the exterior surface of objective lens 12.

It should be understood that since the sleeve is fixed to carriage 20, and detector 22 is mounted to the carriage, the detector translates along with the sleeve in the longitudinal direction. Although not illustrated, a gap exists between the rear side of faceplate 14 and sleeve 16 to accommodate the longitudinal translation of the sleeve.

A spring 30 is compressed between the objective lens (of the first assembly) and the translating carriage (of the second assembly) to urge the assemblies apart. Moreover, the spring urges sleeve 16 and objective lens 12 apart since the sleeve is threadedly coupled to carriage 20. A protective ring 28 is positioned between the spring and the objective lens to shield the objective lens from harm (e.g. scratch or abrasion) by the spring. In use, as the IR detector translates relative to the objective lens, the spring compression changes. The functionality of the spring will be described in further detail later with reference to FIGS. 2A and 2B.

Referring still to FIGS. 1A through 1C, although sleeve 16 floats over the body of lens 12, the travel range of the sleeve is limited. As best illustrated in FIG. 1C, several pins 54 are fixedly inserted through holes 57 that are radially positioned on the sleeve. The pins are positioned to engage slots 56 that are radially positioned on the exterior surface of the objective lens. The engagement between the pins and slots restricts the float of the sleeve over objective lens 12. More particularly, the boundary of the slots define the range of motion for the pins (and sleeve). The total travel range of sleeve 16 over objective lens 12, which is the total travel of the first channel, may be about ½ of a millimeter. However, the channels of device 10 are not limited to any specific range of motion.

In summary, the first channel includes collar 18 that floats between two assemblies urged apart by spring 30. In the first assembly, objective lens 12 and brackets 44 and 45 are fixed to faceplate 14 and cam drivers 40, 50 are engaged with the brackets by virtue of screw 42. In the second assembly, sleeve 16 and IR detector 22 are fixed to opposite sides of carriage 20. The cam drivers 40, 50 bear on floating collar 18 which bears on sleeve 16. The transverse translation of the cam drivers (by virtue of the rotation of screw 42) induces a longitudinal translation of collar 18, sleeve 16 and IR detector 22 thereby changing the longitudinal distance between IR detector 22 and objective lens 12.

The distance separating detector 22 and objective lens 12 is also controlled by the distance sleeve 16 is threaded onto carriage 20. The knurled surface 52 is also provided to facilitate rotation of the sleeve onto the carriage: In assembly, the sleeve is threaded onto the carriage a pre-determined distance. The device 10 is subsequently enclosed so that the user is restricted from manually rotating the knurled surface. However, the user is provided a handle (not shown) that is coupled to screw 42, which is not enclosed within the device, so that the user may set the focus of both channels. It should be understood that the rotation of the knurled surface of the sleeve controls the focus setting of a single channel, whereas the rotation of screw 42 simultaneously controls the focus setting of both channels, i.e. the first channel and the second channel.

The ganged focus mechanism of the optical device includes screw 42, the spring, the cam drivers, the collars, the sleeves and the carriages. The interaction and inter relationship between those components simultaneously controls the focus setting of both channels. The term "ganged focus mechanism" implies that a mechanism simultaneously controls the focus of multiple channels. The ganged focus mechanism also facilitates individual focusing of each channel to tune the objective lenses to their respective focal plane position to match a prescribed focus distance.

Figure 2A:
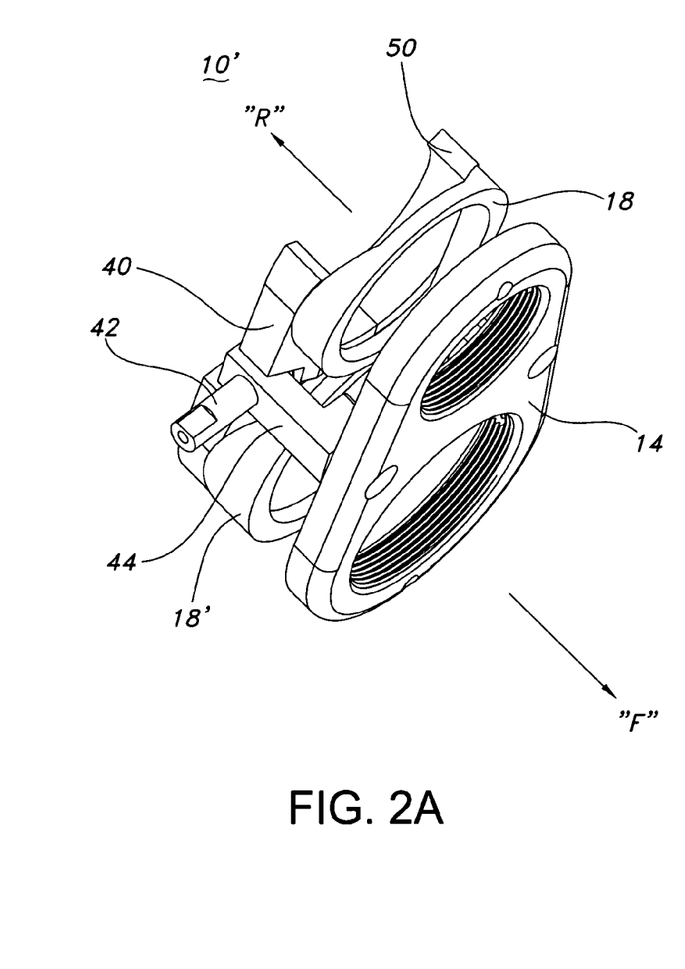
FIG. 2A is a perspective view from the top left of the night vision optical device of FIG. 1A in a near focus configuration (various components of the device are omitted for clarity)
Figure 2B:
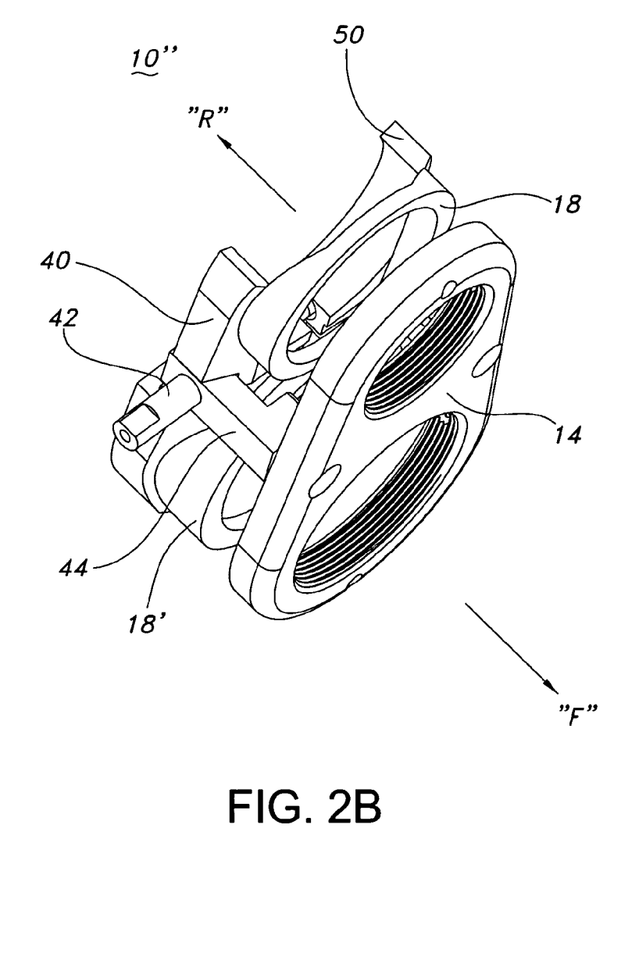
FIG. 2B is a perspective view from the top left of the night vision optical device of FIG. 1A in a far focus configuration (various components of the device are omitted for clarity)

Referring now to FIGS. 2A and 2B, various components of the prior exemplary embodiment are omitted for the purpose of clarity. The figures illustrate the cooperation between cam drivers 40 and 50 and collars 18 and 18'. The device is illustrated in a near focus configuration in FIG. 2A and is illustrated in a far focus configuration (i.e. focus at infinity) in FIG. 2B.

Figure 3A:
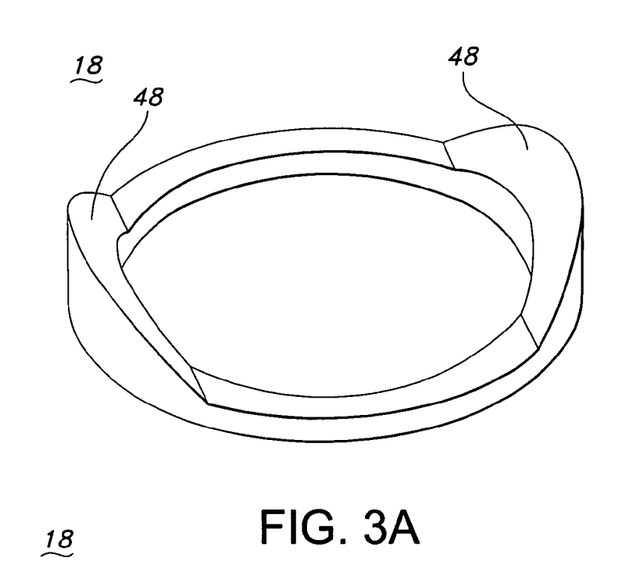
FIG. 3A is a perspective view from the top rear of an exemplary collar illustrated in FIG. 1A.
Figure 3B:
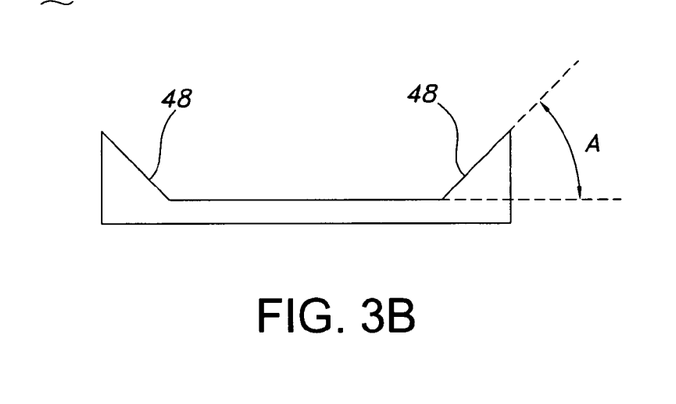
FIG. 3B is a top plan view of the collar of FIG. 3A.
Figure 4A:
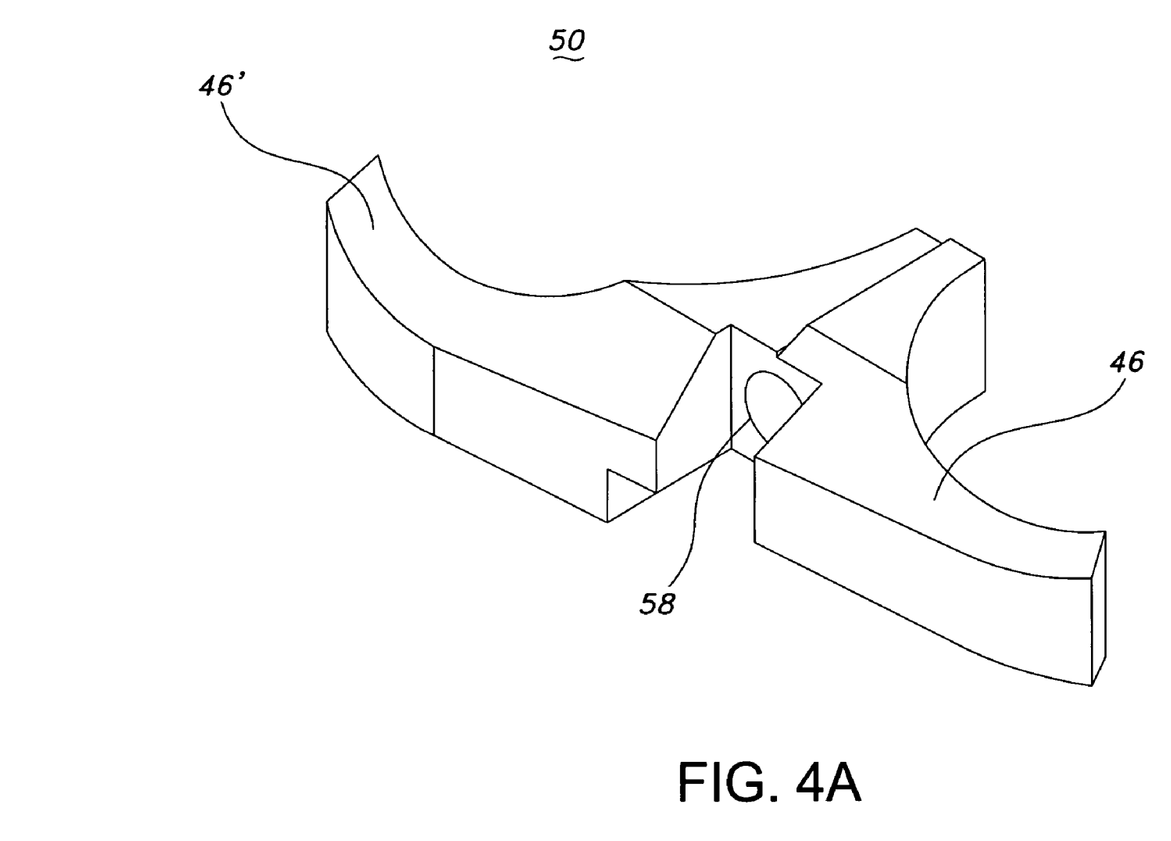
FIG. 4A is a perspective view from the top right of an exemplary cam driver illustrated in FIG. 1A.
Figure 4B:
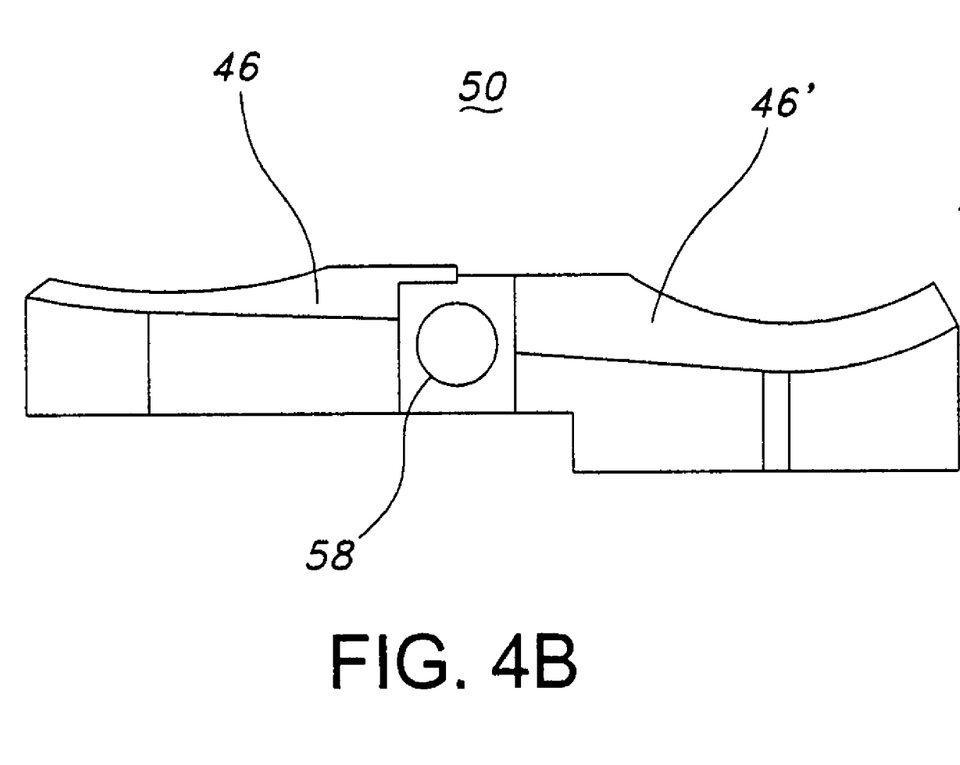
FIG. 4B is an elevation view from the left side of the cam driver of FIG. 4A.
Figure 4C:
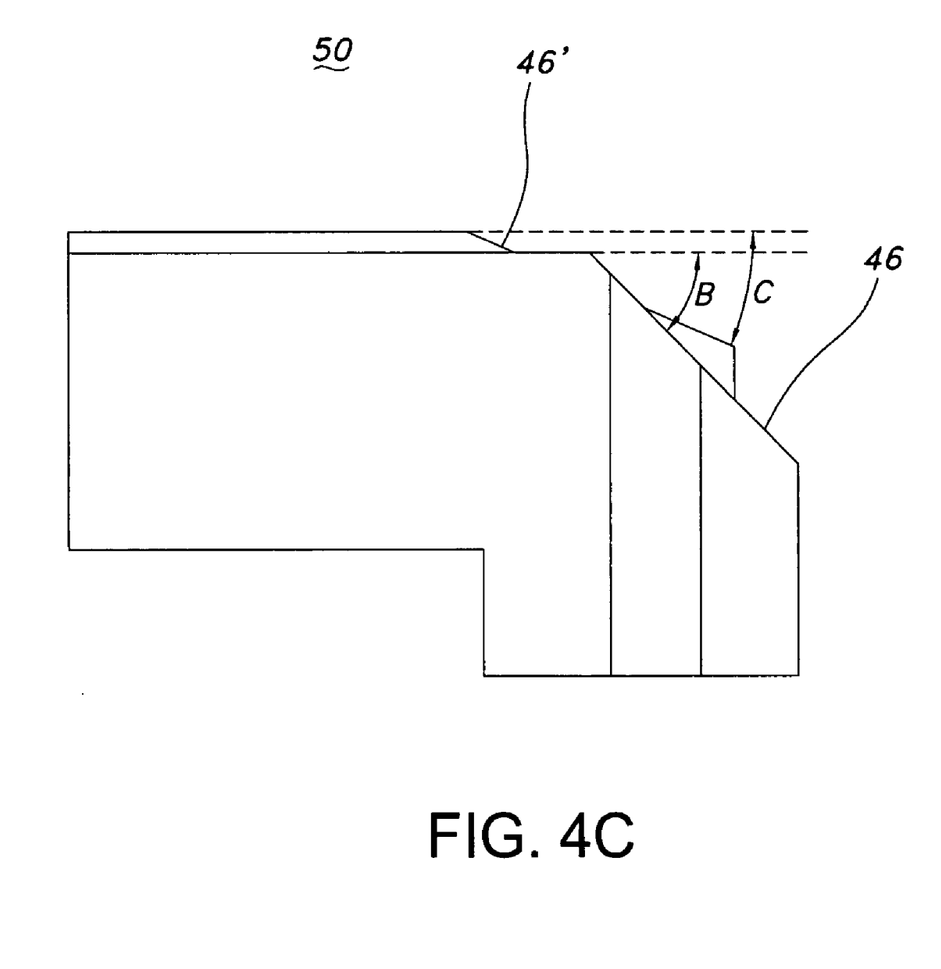
FIG. 4C is a top plan view of the cam driver of FIG. 4A.
Figure 4D:
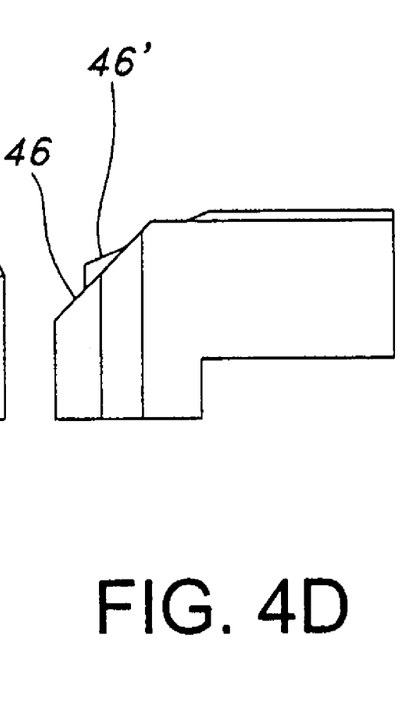
FIG. 4D is a bottom plan view of the cam driver of FIG. 4A.

More particularly, starting from the near focus configuration of the optical device 10' illustrated in FIG. 2A, the entire face of the cam surfaces of the cam drivers are maintained in frictional contact with the cam surfaces of collars 18 and 18'. [The cam surfaces 46, 46' of the cam drivers are best illustrated in FIGS. 4A–4D and cam surfaces 48 of collar 18 are best illustrated in FIGS. 3A and 3B.] As screw 42 rotates in a counterclockwise direction, the cam drivers translate outwardly in a transverse direction. The cam drivers are substantially restricted from translation in the longitudinal direction since they are fixed to brackets 44 and 45. As the cam drivers translate, the cam surfaces 46, 46' of the cam drivers slide along cam surfaces 48 of the collar thereby translating the collar in a forward longitudinal direction, as illustrated in the far focus configuration of FIG. 2B. The forward and reverse longitudinal directions are indicated by the arrows pointing towards "F" and "R", respectively. The cam surfaces 46, 46' of the cam drivers then partially contact cam surfaces 48 of the collar, as shown in FIG. 2B. As described previously, sleeve 16 and IR detector 22 translate forward along with the collar. The spring 30 compresses as the IR detector translates forward, thereby decreasing the longitudinal distance between IR detector 22 and objective lens 12.

Conversely, starting from the far focus configuration of the optical device 10" illustrated in FIG. 2B, as screw 42 rotates in a clockwise direction, the cam drivers translate inwardly in the transverse direction. As the cam drivers translate, cam surfaces 46, 46' of the cam drivers slide along cam surfaces 48 of the collar. The spring 30 is permitted to expand, thereby translating the carriage, IR detector and the sleeve in a reverse longitudinal direction. The knurled shoulder 52 of the sleeve bears against the collar and urges the collar to also translate in the reverse longitudinal direction until the entire face of the cam driver cam surfaces 46, 46' are in frictional contact with the collar cam surfaces 48, as shown in the near focus configuration of FIG. 2A. It should be understood that as the IR detector translates in the reverse longitudinal direction the distance between IR detector 22 and objective lens 12 increases.

Referring now to FIGS. 3A and 3B, an exemplary embodiment of collar 18 configured for use with the first channel is illustrated. The collar 18' configured for use with the second channel is substantially similar to collar 18. The collar 18 is substantially cylindrical and includes two extended cam surfaces 48. The angle "A" of the cam surface may be any angular dimension. As mentioned previously, the collar is hollow to accommodate the cylindrical body of sleeve 16 therethrough.

Referring now to FIGS. 4A–4D, an exemplary embodiment of cam driver 50 is illustrated. Although one cam driver is illustrated, cam drivers 40 and 50 are symmetrical and substantially similar. A threaded hole 58 (right handed thread) provided on a side of the cam driver is threadedly engaged with screw 42. Alternatively, the opposing cam driver 40 includes a left handed threaded hole that is threadedly engaged with an opposing end of screw 42. Thus, the cam drivers translate in opposite transverse directions in response to a rotation of the screw. The cam driver comprises two semi-circular cam surfaces 46 and 46' configured for contact with collars 18 and 18', respectively. The angle "B" of cam surface 46 and the angle "C" of cam surface 46' may be any angular dimension. It should be understood that both cam surfaces 46 and 46' are integral with the cam drivers, and they simultaneously translate both collars 18 and 18', thereby simultaneously altering the focus of both channels. Although the cam drivers include two cam surfaces 46 and 46', each cam driver may optionally include a single cam surface that is positioned in frictional contact with the cam surfaces of the collars.

In use and referring to FIGS. 3A, 3B and 4A–4D, cam surfaces 46, 46' of the cam drivers slide along cam surfaces 48 of collar 18. Each cam driver includes at least one sloping cam surface 46 to bear against at least one cam surface 48 of collar 18 to thereby control the focus of the first channel. Furthermore, each cam driver includes at least one sloping cam surface 46' to bear against at least one cam surface of collar 18' to thereby control the focus of the second channel.

The cam surfaces of collars 18 and 18' and the cam drivers are angled to convert the transverse translation of the cam drivers into longitudinal translation of the collar. The cam surfaces 46, 46' and 48 may be optionally planar, as shown, so that the translational relationship between the cam driver and the collar is linear. Angle "A" and angle "B" are desirably equivalent so that the cam surfaces of the collar and cam driver are maintained in sufficient frictional contact. Moreover, although the cam surface of collar 18' is not illustrated, the angle of that cam surface is desirably equivalent to angle "C" of cam surface 46'. By way of non-limiting example, angle "A" may be about 22 degrees, angle "B" may be about 22 degrees and angle "C" may be about 45 degrees. It should be understood that the cam surfaces 46, 46' and 48 may optionally be non-planar (i.e. curved), so that the translational relationship between the cam driver and the collar is non-linear, if so desired.

In practice and according to this exemplary embodiment, although cam surfaces 46, 46' of the cam drivers translate in the transverse direction at the same rate, collars 18 and 18' do not longitudinally translate at equal rates, by virtue of the unequal angles "B" and "C" of the cam driver. Therefore, since collars 18 and 18' translate at unequal rates, the rate of focus of the first and second channels are unequal, i.e. the change in distance separating the respective lenses and detectors is unequal. However, the angles "B" and "C" may be equal if so desired to achieve equal focus of both channels. Furthermore, the angles "B" and "C" of the cam driver and/or the angle of the cam surface of the collars may be any dimension.

In summary, although the focus of the first and second channels are simultaneously adjusted by virtue of the ganged focus mechanism, the rate of focus of each channel may not be equal by virtue of the aforementioned unequal cam surface angles.

The focusing components of the optical device, such as the cam drivers, collars, left and right handed screw, sleeves and carriages may be formed from any material, such as aluminum or steel and formed by any fabrication process such as casting, molding or machining.

Figure 5:
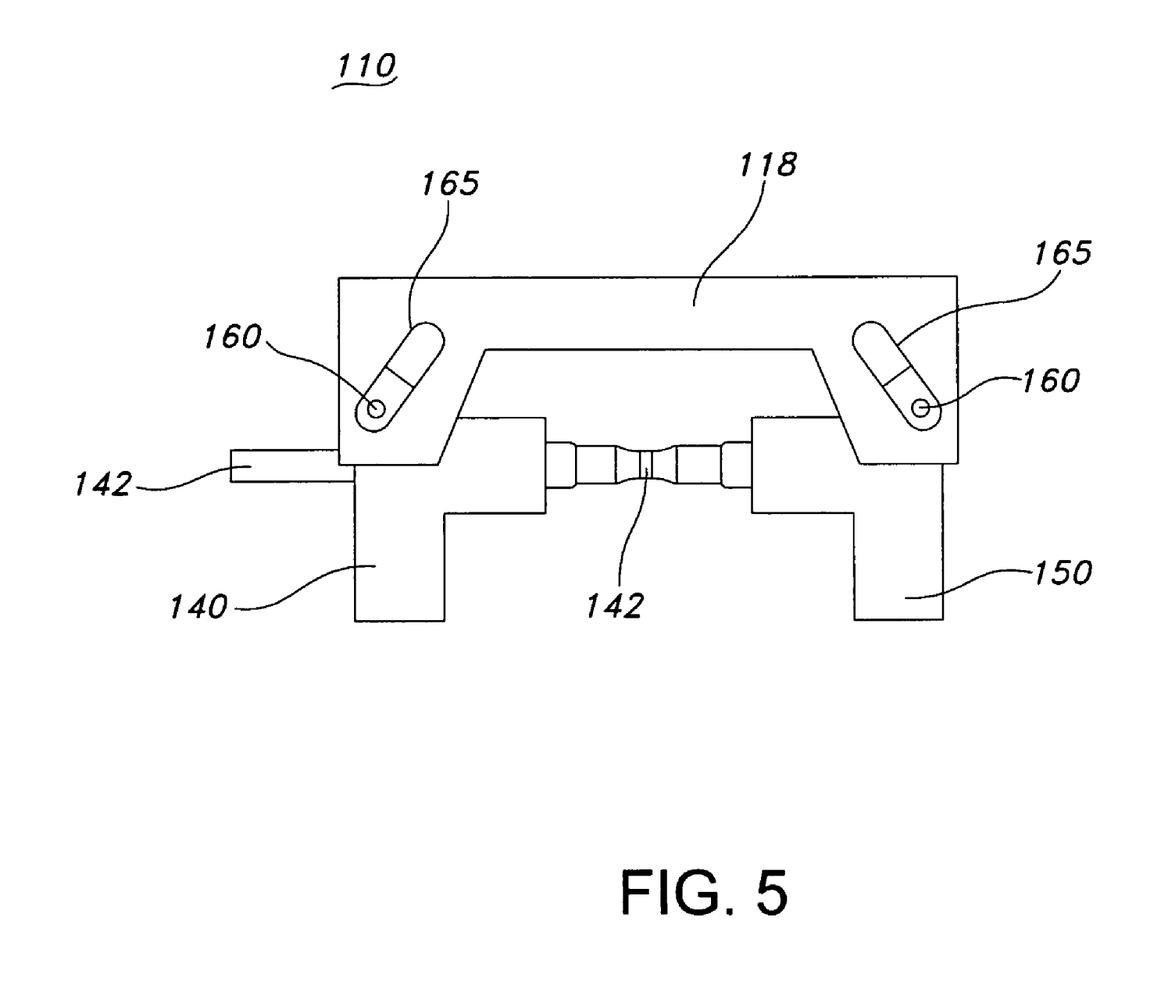
FIG. 5 is a top plan view of another exemplary embodiment of a focusing mechanism used in accordance with the present invention (various components of the mechanism are omitted for clarity).

Another exemplary embodiment of a focusing mechanism 110 is illustrated in FIG. 5 and various components are omitted for clarity. This embodiment is similar to the prior embodiment, however, focusing mechanism 110 includes a cam and slot interface in lieu of spring 30 (refer to FIG. 1C). More specifically, a pin 160 extends from each cam driver 140 and 150. Each pin engages a slots 165 positioned on the collar 118, that is, each pin translates along the boundary of the slots. In practice, as screw 142 rotates, the cam drivers and pins 160 translate in a transverse direction and the pins engages slots 165 to translate (i.e. drive) the collar 118 in a longitudinal direction. Similar to the last embodiment, the sleeve, carriage and detector also translate in the longitudinal direction along with collar 118, thereby altering the longitudinal distance between the detector and the objective lens, and, thus, altering the focus setting of the channels.

Referring back to FIGS. 1A and 1B, objective lenses 12 and 26 are separated by a vertical distance. One skilled in the art will understand that the vertical separation introduces a parallax disparity, which is an inherent problem in most multiple channel optical systems. Superimposing the images projected through the channels upon one another (i.e. overlay) causes the parallax disparity to manifest itself as a mismatch of the two images. The mismatch of the images is proportional to the degree of separation between the objective lenses relative to the distance between the optical device and the object being observed.

The ganged focus mechanism provides a reference for positional disparity between the objective lenses that can be used as an input for parallax correction in either a mechanical, analog or digital imaging system. It has been discovered that a positioning feedback device coupled to device 10 provides parallax adjustment throughout the entire focus range.

Although not illustrated, a positional feedback device, e.g. a strain gage, hall-effect device, or encoder may be incorporated with the device to measure the distance between an objective lens and its accompanying detector. This measurement can be used to derive the focal distance (i.e. the distance to the subject being imaged) of multiple channels and to provide an input to a table, algorithm or mechanism that can shift either one or more of the detectors themselves or their output images to the prismatic display device (not shown). In this manner, an object viewed at infinity through two channels would appear on the display as a singular image comprising two superimposed images. As the object is moved closer and the separation of the two channels would normally become apparent as an overlay mismatch on the prismatic display, the input from the feedback device of this embodiment would provide an open-circuit instruction for the imaging system to compensate for the parallax disparity.

In an embodiment, a digital imaging system cooperates with the positional feedback device to vertically shift one image relative to the other image by the appropriate number of pixels on the prismatic display to compensate for the parallax disparity. The mechanical, analog or digital imaging system may also be adapted to translate the image displayed on the prismatic display horizontally to compensate for a lateral displacement error.

Although the invention is illustrated and described herein with reference to specific embodiments, the invention is not intended to be limited to the details shown. Rather, various modifications may be made in the details within the scope and range of equivalents of the claims and without departing from the invention. In particular, although the device is intended for use with a monocular night vision system, it may also be used with a binocular night vision system or any other optical system. Furthermore, although the detectors 22 and 22' translate along the stationary objective lenses in practice, in another embodiment not illustrated herein, the objective lenses may translate along detectors that are maintained in a stationary position. The optical device is also not limited to detector 22 and image intensifier assembly 24, as any wavelength detector or image intensifier may be used. Also, the embodiments selected for illustration in the figures are not shown to scale and are not limited to the proportions shown.

What is claimed is:

1. An optical device for viewing an image comprising:
a plurality of optical channels positioned adjacent one another for monocular viewing, each optical channel having an image detector and a complimentary objective lens spaced by a respective distance; and
a focusing mechanism coupled to the optical device, configured to simultaneously adjust the respective distance between the image detector and the objective lens of each optical channel, wherein each optical channel transmits the same scene image for monocular viewing.

2. The optical device of claim 1 wherein the focusing mechanism includes a cam driver having at least one cam surface and each respective image detector being translatable along said at least one cam surface for simultaneously adjusting the distance between each respective image detector and objective lens.

3. The optical device of claim 2 further comprising a collar having a cam surface, wherein said cam surface of said cam driver engages said cam surface of said collar for simultaneously adjusting the distance between each respective image detector and objective lens.

4. The optical device of claim 3 wherein said collar and said cam driver are positioned between said objective lenses and said image detectors.

5. The optical device of claim 3 further comprising a spring positioned to urge said cam surface of said collar against said cam surface of said cam driver.

6. The optical device of claim 3 further comprising a pin extending from said cam driver that extends through a slot positioned in said collar, wherein said pin and said slot cooperate to translate said cam driver and said collar in orthogonal directions relative to each other.

7. The optical device of claim 3 wherein said cam driver and said collar translate in substantially orthogonal directions relative to each other.

8. The optical device of claim 1 wherein the focusing mechanism includes a cam driver having at least one cam surface and each respective objective lens being translatable along said at least one cam surface for simultaneously adjusting the distance between each respective image detector and objective lens.

9. The optical device of claim 1 wherein each respective image detector and complimentary objective lens are axially aligned with respect to each other.

10. The optical device of claim 1 wherein one of said image detectors is an image intensifier ($I^2$).

11. The optical device of claim 1 wherein one of said image detectors is an infrared device (IR).

12. The optical device of claim 1 further comprising a positioning feedback device coupled to the focusing mechanism to regulate the parallax disparity between the optical channels.

13. A focusing mechanism configured for use with an optical device having a plurality of optical channels positioned adjacent one another for monocular viewing, each channel including an image detector and a complimentary objective lens spaced by a respective distance, wherein each optical channel transmits the same scene image for monocular viewing and the focusing mechanism is adapted to simultaneously adjust the respective distance between each respective image detector and objective lens.

14. The focusing mechanism of claim 13 wherein the focusing mechanism includes a cam driver having at least one cam surface and each respective image detector translatable along said at least one cam surface for simultaneously adjusting the distance between each respective image detector and objective lens.

15. The focusing mechanism of claim 14 further comprising a collar having a cam surface, wherein said cam surface of said cam driver engages said cam surface of said collar to adjust the distance between each respective image detector and objective lens.

16. The focusing mechanism of claim 15 further comprising a pin extending from said cam driver that extends through a slot positioned in said collar, wherein said pin and said slot cooperate to translate said cam driver and said collar in substantially orthogonal directions relative to each other.

17. The focusing mechanism of claim 15 further comprising a spring positioned to urge said cam surface of said collar against said cam surface of said cam driver.

18. The focusing mechanism of claim 13 wherein the focusing mechanism includes a cam driver having at least one cam surface and each respective objective lens being translatable along said at least one cam surface for simultaneously adjusting the distance between each respective image detector and objective lens.

19. The focusing mechanism of claim 13 wherein each respective image detector and complimentary objective lens are axially aligned with respect to each other.

20. The focusing mechanism of claim 13 further comprising a positioning feedback device coupled to the focusing mechanism to regulate the parallax disparity between the optical channels.

* * * * *